United States Patent
Weissman et al.

(10) Patent No.: US 9,268,839 B2
(45) Date of Patent: Feb. 23, 2016

(54) METHODS AND SYSTEMS FOR EDITING A NETWORK OF INTERCONNECTED CONCEPTS

(71) Applicant: Google Inc., Mountain View, CA (US)

(72) Inventors: Adam J. Weissman, Federal Way, WA (US); Gilad Israel Elbaz, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/861,600

(22) Filed: Apr. 12, 2013

(65) Prior Publication Data

US 2013/0232145 A1     Sep. 5, 2013

Related U.S. Application Data

(60) Continuation of application No. 13/277,693, filed on Oct. 20, 2011, now Pat. No. 8,661,060, which is a division of application No. 10/748,399, filed on Dec. 30, 2003, now Pat. No. 8,051,104, which is a (Continued)

(51) Int. Cl.
*G06F 17/30*     (2006.01)

(52) U.S. Cl.
CPC .... *G06F 17/30595* (2013.01); *G06F 17/30616* (2013.01); *G06F 17/30731* (2013.01); *G06F 17/30734* (2013.01); *G06F 17/30873* (2013.01); *Y10S 707/953* (2013.01); *Y10S 707/956* (2013.01); *Y10S 707/96* (2013.01)

(58) Field of Classification Search
CPC ............... G06F 17/30595; G06F 17/30616; G06F 17/30731; G06F 17/30734; G06F 17/30873
See application file for complete search history.

(56) References Cited

U.S. PATENT DOCUMENTS

| | | | |
|---|---|---|---|
| 4,839,853 A | 6/1989 | Deerwester et al. |
| 5,325,298 A | 6/1994 | Gallant |
| 5,404,506 A | 4/1995 | Fujisawa et al. |
| 5,499,360 A | 3/1996 | Barbara et al. |
| 5,619,709 A | 4/1997 | Caid et al. |
| 5,694,523 A | 12/1997 | Wical |

(Continued)

FOREIGN PATENT DOCUMENTS

| | | |
|---|---|---|
| EP | 1160686 A2 | 12/2001 |
| KR | 2001113258 A | 12/2001 |
| WO | WO0079436 A3 | 12/2003 |

OTHER PUBLICATIONS

Apted et al., "Visualization of Ontological Inferences for User Control of Personal Web Agent," Proceedings of the Seventh International Conference on Information Visualization, 306-311 (Jul. 2003).

(Continued)

*Primary Examiner* — Usmaan Saeed
*Assistant Examiner* — Paul Kim
(74) *Attorney, Agent, or Firm* — Fish & Richardson P.C.

(57) ABSTRACT

Systems and methods that create and edit a network of interconnected concepts are disclosed. In one embodiment, a semantic engine implements a method comprising receiving a primary term representing a first concept to be added to a network of interrelated concepts, receiving at least one related term related to the primary term, receiving at least one relationship between the first concept and a second concept, receiving a strength value associated with the relationship, and adding the first concept to the network.

20 Claims, 6 Drawing Sheets

Related U.S. Application Data continuation-in-part of application No. 09/493,701, filed on Jan. 28, 2000, now Pat. No. 6,816,857, which is a continuation-in-part of application No. 09/431,760, filed on Nov. 1, 1999, now Pat. No. 6,453,315.

(60) Provisional application No. 60/155,667, filed on Sep. 22, 1999, provisional application No. 60/491,422, filed on Jul. 30, 2003.

(56) References Cited

U.S. PATENT DOCUMENTS

| | | |
|---|---|---|
| 5,708,822 A | 1/1998 | Wical |
| 5,724,571 A | 3/1998 | Woods |
| 5,768,580 A | 6/1998 | Wical |
| 5,778,363 A | 7/1998 | Light |
| 5,778,364 A | 7/1998 | Nelson |
| 5,806,060 A | 9/1998 | Borgida et al. |
| 5,845,278 A | 12/1998 | Kirsch et al. |
| 5,848,396 A | 12/1998 | Gerace |
| 5,878,223 A | 3/1999 | Becker et al. |
| 5,887,120 A | 3/1999 | Wical |
| 5,918,236 A | 6/1999 | Wical |
| 5,930,788 A | 7/1999 | Wical |
| 5,933,822 A | 8/1999 | Braden et al. |
| 5,940,821 A | 8/1999 | Wical |
| 5,953,718 A | 9/1999 | Wical |
| 5,960,383 A | 9/1999 | Fleischer |
| 5,987,404 A | 11/1999 | Della et al. |
| 6,038,560 A | 3/2000 | Wical |
| 6,044,375 A | 3/2000 | Shmueli et al. |
| 6,061,675 A | 5/2000 | Wical |
| 6,067,552 A | 5/2000 | Yu |
| 6,101,515 A * | 8/2000 | Wical et al. .......... 715/234 |
| 6,112,201 A | 8/2000 | Wical |
| 6,119,164 A | 9/2000 | Basche |
| 6,134,532 A | 10/2000 | Lazarus et al. |
| 6,199,034 B1 | 3/2001 | Wical |
| 6,240,410 B1 | 5/2001 | Wical |
| 6,269,361 B1 | 7/2001 | Davis et al. |
| 6,289,342 B1 | 9/2001 | Lawrence et al. |
| 6,289,353 B1 | 9/2001 | Hazlehurst et al. |
| 6,298,348 B1 | 10/2001 | Eldering |
| 6,314,419 B1 | 11/2001 | Faisal |
| 6,324,519 B1 | 11/2001 | Eldering |
| 6,324,538 B1 | 11/2001 | Wesinger et al. |
| 6,421,675 B1 | 7/2002 | Ryan et al. |
| 6,453,315 B1 | 9/2002 | Weissman et al. |
| 6,460,034 B1 | 10/2002 | Wical |
| 6,473,730 B1 | 10/2002 | McKeown et al. |
| 6,484,161 B1 | 11/2002 | Chipalkatti et al. |
| 6,487,545 B1 | 11/2002 | Wical |
| 6,594,658 B2 | 7/2003 | Woods |
| 6,651,058 B1 | 11/2003 | Sundaresan et al. |
| 6,763,349 B1 | 7/2004 | Sacco |
| 6,816,857 B1 | 11/2004 | Weissman et al. |
| 7,024,624 B2 | 4/2006 | Hintz |
| 2001/0049674 A1 | 12/2001 | Talib et al. |
| 2001/0049688 A1 | 12/2001 | Fratkina et al. |
| 2002/0099700 A1 | 7/2002 | Li |
| 2002/0133392 A1 | 9/2002 | Angel et al. |
| 2002/0165849 A1 | 11/2002 | Singh et al. |
| 2002/0174101 A1 | 11/2002 | Fernley et al. |
| 2003/0018626 A1 | 1/2003 | Kay et al. |
| 2003/0084066 A1 | 5/2003 | Waterman et al. |
| 2003/0115187 A1 | 6/2003 | Bode et al. |
| 2003/0126235 A1 | 7/2003 | Chandrasekar et al. |
| 2004/0024739 A1 | 2/2004 | Copperman et al. |
| 2004/0236737 A1 | 11/2004 | Weissman et al. |
| 2005/0223002 A1 | 10/2005 | Agarwal et al. |
| 2006/0064403 A1 | 3/2006 | Rechterman et al. |
| 2006/0069613 A1 | 3/2006 | Marquardt |
| 2006/0259357 A1 | 11/2006 | Chiu |

OTHER PUBLICATIONS

"Applied Semantics Launches Contextual Targeting Pay-For-Performance Ad Serving Solution," Applied Semantics—Press Release, Oct. 21, 2002, pp. 1-2, http://www.appliedsemantics.com/ne/ne_pr_102102.html.

"Applied Semantics Launches News Series to Power Publishing," Applied Semantics. Inc.—Press Release, Aug. 13, 2002, pp. 1-2, http://www.appliedsemantics.com/ne/ne_pr_081302.html.

"Applied Semantics News Series," pp. 1-4, brochure, no date.

Chi et al., "Context Query in Information Retrieval," Proceedings of the 14th IEEE International Conference on Tools with Artificial Intelligence, IEEE Comp. Soc., vol. Conf. 14, 101-106 (Nov. 2002).

"CIRCA Technology Overview," Applied Semantics White Paper, Jul. 2001, pp. 1-10.

"CONVERA—Products: RetrievalWare," printed Oct. 30, 2003, http://www.convera.com/products/rw_precisions.asp.

Fellbaum, ed. "WordNet: An Electronic Lexical Database," Cambridge: The MIT Press, Mar. 1998, pp. 117-127, 285-303. P325.5. D38W67 (1998).

Geller, "Quigo Signs Deal with Overture," MediaDailyNews, Aug. 13, 2003, pp. 1-3, http://www.mediapost.com/dtls_dsp_news.cfm?newsID=215196.

Kerschberg et al., "A Semantic Taxonomy-Based Personalizable Meta-Search Agent," Conference Proceedings Article, vol. 1 (Dec. 2001).

Koll, "Information Retrieval Theory and Design Based on a Model of the User's Concept Relations," 351 Proceedings of the 3d Annual ACM Conference on Research and Development in Information Retrieval, 1980, pp. 77-93.

Lin et al., "Discovering informative content blocks from Web documents," Proceedings of the ACM SIGKDD International Conference on Knowledge Discovery and Data Mining, 588-593 (Jul. 23, 2002-Jul. 26, 2002), Edmonton, Alberta, Canada.

"Ontology Usage and Applications," Applied Semantics Technical White Paper, Jul. 2001, pp. 1-15.

"Powerful Revenue Solutions for Online Publishers," Applied Semantics AdSense, pp. 1-2. brochure, no date.

Tengi, "Design and Implementation of the WordNet Lexical Database and Searching Software," in WordNet: An Electronic Lexical Database, Fellbaum C. ed.. Cambridge: The MIT Press. Mar. 1998, pp. 105-127.

"Verity Introduces Customizable Industry and Enterprise Taxonomies," Verity, Nov. 17, 2003, pp. 1-2.

Voorhees, "Query Expansion Using Lexical-Semantic Relations," Proceedings of the 17th Annual ACM Conference on Research and Development in Information Retrieval, Aug. 1994, pp. 61-69.

Voss et al., "Concepts as Knowledge Handles in Collaborative Document Management," Enabling Technologies: Infrastructure for Collaborative Enterprises (1999).

International Search Report and Written Opinion for PCT/US04/023828, dated Nov. 29, 2004, 8 pages.

International Preliminary Report on Patentability for PCT/US04/023828, dated Jan. 30, 2006, 6 pages.

International Preliminary Report on Patentability for PCT US2004/023826, dated Jan. 30, 2006, 6 pages.

International Search Report and Written Opinion for PCT US2004/023826, dated Nov. 17, 2004, 9 pages.

Notification of Transmittal of the International Search Report and the Written Opinion of the International Searching Authority for PCT/US2008/053854, dated Jun. 25, 2008, 10 pages.

Office Action issued in U.S. Appl. No. 10/748,399 on Aug. 4, 2006, 14 pages.

Office Action issued in U.S. Appl. No. 10/748,399 on Nov. 22, 2006, 9 pages.

Office Action issued in U.S. Appl. No. 10/748,399 on Oct. 3, 2007, 10 pages.

Office Action issued in U.S. Appl. No. 10/748,399 on May 1, 2008.

(56) References Cited

OTHER PUBLICATIONS

Office Action issued in U.S. Appl. No. 10/748,399 on Sep. 26, 2008, 15 pages.
Office Action issued in U.S. Appl. No. 10/748,399 on Apr. 16, 2009, 12 pages.
Office Action issued in U.S. Appl. No. 10/748,399 on Nov. 5, 2010, 12 pages.
Notice of Allowance issued in U.S. Appl. No. 10/748,399 on Jul. 27, 2011, 26 pages.
Office Action issued in U.S. Appl. No. 13/277,693 on Oct. 1, 2012, 29 pages.
'Wikipedia' [online]. "Entity—relationship model," Jan. 31, 2015 [retrieved on Feb. 19, 2015]. Retrieved from the internet: http://en.wikipedia.org/wiki/Entity%E2%80%93relationship_model, 11 pages.
Chen, "Entity-Relationship Modeling: Historical Events, Future Trends, and Lessons Learned," Software pioneers. Springer-Verlag. 2002, pp. 296-310. ISBN 3-540-43081-4.

* cited by examiner

METHODS AND SYSTEMS FOR EDITING A NETWORK OF INTERCONNECTED CONCEPTS

CROSS-REFERENCE TO RELATED APPLICATIONS

This application is a continuation of U.S. patent application Ser. No. 13/277,693 filed Oct. 20, 2011, which is a continuation of U.S. patent application Ser. No. 10/748,399, filed Dec. 30, 2003, now U.S. Pat. No. 8,051,104, which is a continuation-in-part of U.S. patent application Ser. No. 09/493,701 filed Jan. 28, 2000, now U.S. Pat. No. 6,816,857, which is is a continuation-in-part of U.S. patent application Ser. No. 09/431,760, filed Nov. 1, 1999, now U.S. Pat. No. 6,453,315, which claims priority to U.S. Provisional Application Ser. No. 60/155,667 filed Sep. 22, 1999, all of which are hereby incorporated in their entirety by this reference. U.S. patent application Ser. No. 10/748,399 claims priority to U.S. Provisional Patent Application Ser. No. 60/491,422 filed Jul. 30, 2003, which is hereby incorporated in its entirety by this reference.

FIELD OF THE INVENTION

The invention generally relates to a network of interconnected concepts. More particularly, the invention relates to methods and systems for editing a network of interconnected concepts.

BACKGROUND OF THE INVENTION

Improving mechanisms for searching vast numbers of documents, such as those available via the World Wide Web ("web") or on large enterprise computer networks, has increasingly been an area of focus and research. This is especially due to the continued growth in the number of computer users, services and applications offered for example on the web, and the amount of information being added to the web, enterprise computer networks and other databases.

A search engine or search engine program is a widely used mechanism for allowing users to search vast numbers of documents for information. Conventional search engines index the documents and the terms appearing in the documents. A term can be a string of characters or groups of strings of characters representing a one or more related words. Generally, a search engine provides a user interface that includes a query field. A user can enter one or more search terms describing the desired information in the query field. In response to a query, the search engine attempts to locate relevant documents by matching the search terms to the indexed terms appearing in the documents. Based on these matches, the search engine ranks, sorts and then returns for display the search results, usually as a list of relevant documents.

Typically, the concept or concepts represented by the search terms or the terms in the documents are not taken into account. A concept can be a normalized semantic representation that can be expressed with any number of terms. Methods of complex searching exist, but most of these methods of complex searching are term based. For example, an advanced Boolean search or an advanced text search are both based on terms and not concepts. With a term search, documents are converted into a list of terms with relative rankings and the document's terms are compared with the search terms. Term searches can provide poor results when faced with terms having multiple meanings, the use of synonyms, and important terms that are not used frequently. Further, it is difficult to search for a concept using term-based searching methods. For example, if it is desired to search all documents that mention the concept "California cities", each city must be enumerated as a search term.

In order to provide a concept-based search, a search engine can utilize a network of concepts. While such networks of concepts exist, these conventional networks generally associate concepts in a hierarchical fashion and provide no weight to the associations. Further, such conventional networks of concepts are not easily editable.

SUMMARY

Embodiments of the present invention comprise methods and systems for editing a network of interconnected concepts. In one embodiment, a semantic engine implements a method comprising receiving a primary term representing a first concept to be added to a network of interrelated concepts, receiving at least one related term related to the primary term, receiving at least one relationship between the first concept and a second concept, receiving a strength value associated with the relationship, and adding the first concept to the network. In another embodiment, a semantic engine implements a method comprising receiving a request to edit a first concept in a network of interrelated concepts, causing the display of the first concept, receiving a request to add at least one relationship between the first concept and a second concept, receiving a strength value associated with the relationship, and updating the first concept in the network. Additional aspects of the present invention are directed to computer systems and to computer-readable media having features relating to the foregoing aspects.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for editing a network of interconnected concepts. In one embodiment, a semantic engine allows for the creation and editing of concepts in a network of interconnected concepts or ontology. The concepts can be defined by a synset or a group of related terms, such as synonyms and acronyms, relationships, both hierarchical and lateral, with other concepts, and the strength of the relationships with other concepts. The semantic engine allows for the creation or editing of a concept by allowing a user to define the related terms, the relationships with other concepts, and the strength of the relationships.

Reference will now be made in detail to exemplary embodiments of the invention as illustrated in the text and accompanying drawings. The same reference numbers are used throughout the drawings and the following description to refer to the same or like parts.

Figure 1:
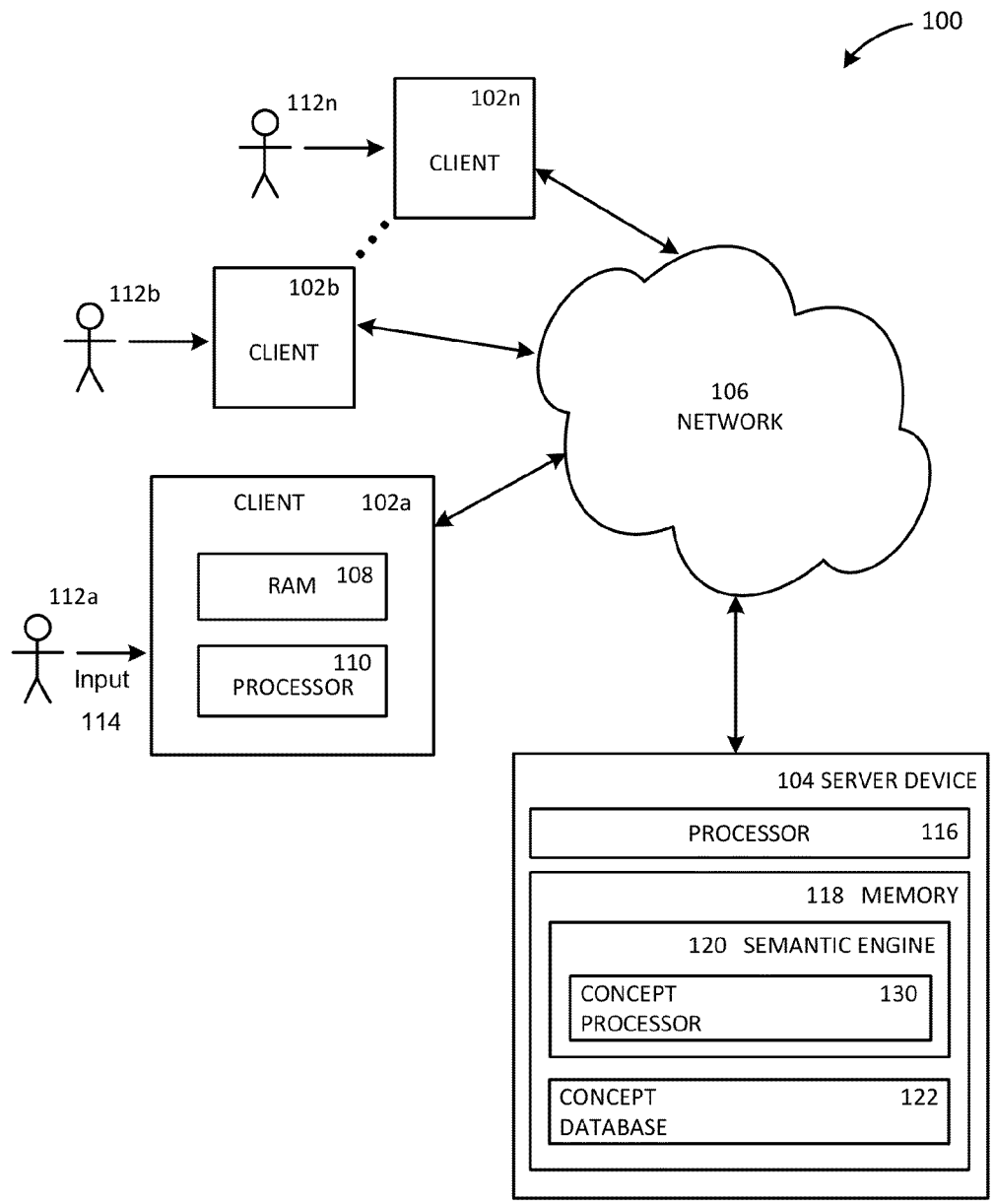
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104 and a network 106. The network 106 shown can be the Internet. In other embodiments, other networks, such as an intranet may be used. Moreover, methods according to the present invention may operate in a single computer. The client devices 102a-n shown each include a computer-readable medium, such as a random access memory (RAM) 108 in the embodiment shown, coupled to a processor 110. The processor 110 executes a set of computer-executable program instructions stored in memory 108. Such processors may include a microprocessor, an ASIC, and state machines. Such processors include, or may be in communication with, storage devices, for example computer-readable storage devices, which store instructions that, when executed by the processor, cause the processor to perform the steps described herein. Embodiments of computer-readable storage devices include, but are not limited to, an electronic, optical, magnetic, or other storage device capable of providing a processor, such as the processor in communication with a touch-sensitive input device, with computer-readable instructions. Other examples of suitable storage devices include, but are not limited to, a floppy disk, CD-ROM, magnetic disk, memory chip, ROM, RAM, an ASIC, a configured processor, all optical media, all magnetic tape or other magnetic media, or other medium from which a computer processor can read instructions. The instructions may comprise code from any computer-programming language, including, for example, C, C++, C#, VISUAL BASIC, JAVA, PYTHON, PERL, and JAVASCRIPT.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a user interface application program and/or a browser application program such as Internet Explorer™, version 6.0 from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server device 104 is also coupled to the network 106. The server device 104 shown includes a server executing a semantic engine program. The system 100 can also include multiple other server devices. Similar to the client devices 102a-n, the server device 104 shown includes a processor 116 coupled to a computer readable memory 118. The server device 104 is depicted as a single computer system, but may be implemented as a network of computer processors. Examples of server device 104 are servers, mainframe computers, networked computers, a processor-based device and similar types of systems and devices. Client processors 110 and server processor 116 can be any of a number of well known computer processors, such as processors from Intel Corporation of Santa Clara, Calif. and Motorola Corporation of Schaumburg, Ill.

Memory 118 of the server device 104 contains a semantic engine application program, also known as a semantic engine 120. The semantic engine 120 manages and provides access to a network of interconnected concepts or ontology. In one embodiment, the semantic engine 120 also can index articles and concepts found in articles to enable the location and retrieval of information. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet or intranet), a personal computer, or other computing or storage means. The embodiments described herein are described generally in relation to documents, but embodiments may operate on any type of article.

The semantic engine 120 shown includes a concept processor 130, which, in the embodiment shown, comprises computer code residing in the memory 118. The concept processor 130 can edit and create concepts in a network of interconnected concepts based on information received from a client device 102a input 114 by a user 112a. The client processor 130 can have a user interface application that allows user 112a via the client device 102a to interact with the concept processor 130 to edit existing concepts and create new concepts in the ontology.

Server device 104 also provides access to other storage elements, such as a concept storage element, in the example shown a concept database 122. The concept database 120 can be used to store the ontology. The concept database can be located in memory 118 as shown or can be located external to server device 104. Data storage elements may include any one or combination of methods for storing data, including without limitation, arrays, hash tables, lists, and pairs. Other similar types of data storage devices can be accessed by the server device 104.

It should be noted that the present invention may comprise systems having different architecture than that which is shown in FIG. 1. For example, in some systems according to the present invention, the semantic engine 120 may not be on a single server device 104, but may be on multiple server devices. The system 100 shown in FIG. 1 is merely exemplary, and is used to explain the exemplary methods shown in FIGS. 5 and 6.

As explained above, the concept database 122 can contain an ontology that can describe a semantic space that can be employed to facilitate concept-based location and retrieval of information. The ontology consists of a plurality of concepts, which are connected to one another through many different types of relationships, such as, for example, "kind of", "has kind", "part", of "has part", "member of", "has member", "substance of", "has substance", "product of", and "has product". For example, the concept of "table" is connected to the concept of "furniture" through a "kind of" connection. Thus, "table" is a "kind of" "furniture". Similarly, "California" is a part of the "United States", the "United States" has part "California", the "United States" is a member of the "NATO", and "NATO" has member "United States".

The ontology according to one embodiment of the present invention also includes bind or lateral bond relationships between concepts. A lateral bond relationship describes one concept's closeness to another in an average person's common understanding. For example, "skier" and "skiing" are not closely related concepts in conventional ontologies. The former is a kind of "athlete", ultimately a kind of "human being"; and thus would reside within the "entity" or "living thing" tree. The latter is a kind of "sport", ultimately a kind of "activity"; it is in the "actions" tree. Though the subjects are closely related in everyday usage, they may be in widely separated locations within a conventional ontology. To remedy this, a bind or lateral bond can be made between the two concepts, to reflect their close proximity in semantic space (when an average person thinks of one concept, the person tends to think of the other).

Figure 2:
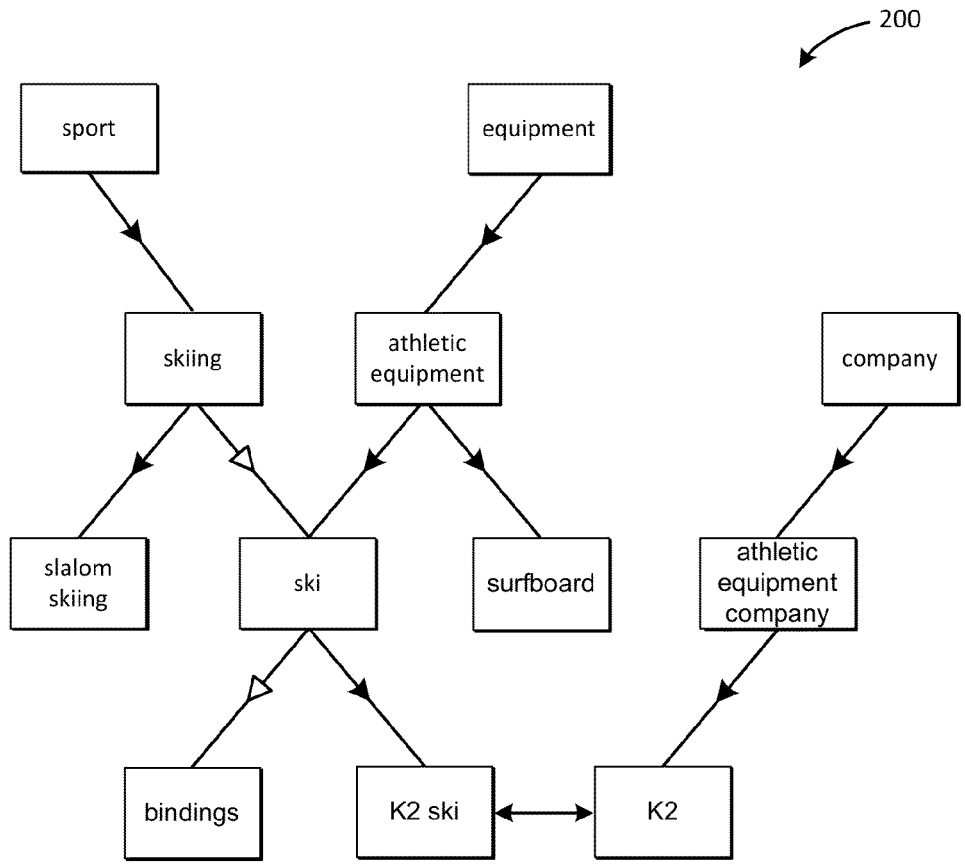
FIG. 2 illustrates an example of a portion of a relationship-based ontology in accordance with one embodiment of the present invention.

The relationships between elements may take on many forms and can become quite complex, but for ease of illustration, a simple example is illustrated by FIG. 2. The boxed elements in FIG. 2 represent meanings within the ontology and collectively, along with the relationship connections between meanings can be viewed as defining a semantic space. The relationship types "part of", "kind of" and "lateral bond" are represented by differing line types in FIG. 2, a legend for which is drawn thereon.

The example in FIG. 2 concerns skiing. Starting with the branch for "sport", "skiing" is defined in the ontology 200 as a kind of "sport". The word "ski" typically, in its noun form, can be thought of as related to "skiing" in that it is a "part of" "skiing" as shown in FIG. 2. "Slalom skiing" is a type of skiing and hence a "kind of" connection is shown between it and "skiing". "Bindings" are a structural attachment on a ski, and hence it is assigned a "part of" connection with "ski". The example of a specific brand of ski, "K2 ski," is given to show how it is in a "kind of" connection with "ski".

"K2 ski" is also assigned a lateral bond showing a conceptual commonness with the manufacturer of the ski "K2" which lies in the "company" branch. The lateral bond can be, for example, "product of". The company branch has a child "athletic equipment company" as a "kind of" "company." "Athletic equipment company" has as its child in turn the "K2" company.

Considering "ski" once again, "ski" is also a child of the "equipment" branch which has "athletic equipment" as a "kind of" "equipment" and ski as a "kind of" "athletic equipment". "Surfboard" is related to "ski" in that it too is a "kind of" "athletic equipment". Target documents or nodes within a subject directory may be "placed" or "located" by human intervention or automatically into the semantic space as defined by ontology 200. A document containing information concerning the sale of skis or skiing destinations would fall somewhere within the defined semantic space based upon its focus of content.

The ontology according to one embodiment of the present invention also includes bond strength between concepts. A value can be assigned to a connection from one concept to another that signifies how strongly the second meaning relates to the first. These connections can be dependant on the direction of the bond, so that, for example, "skier" might imply a strong connection to "skiing", whereas "skiing need not imply "skier" to the same degree.

Figure 3:
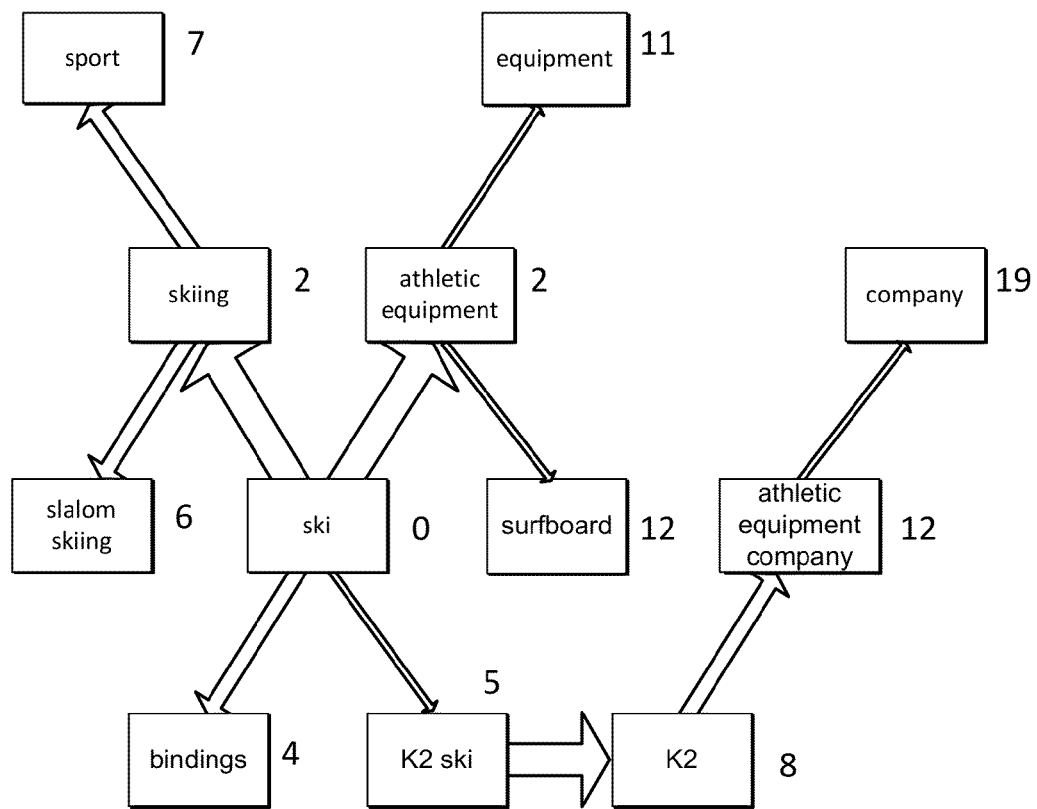
FIG. 3 illustrates an example of bond strength and semantic distance in a portion of a relationship-based ontology in accordance with one embodiment of the present invention.

FIG. 3 illustrates an example of bond strengths and semantic distances between the concepts illustrated in FIG. 2. FIG. 3 illustrates how distance and closeness of meaning between concepts can be quantified within the semantic space. Distances are shown between the element "ski" and all other elements within the semantic space. Using three classes of bond strengths the degree of closeness between concepts may be discovered. A "strong relationship" exists between "ski" and "skiing" as does between "ski" and "athletic equipment." Between "skiing" and "sport" there is a weaker than strong relationship known as a "medium relationship". This is because when the average person thinks of the root term "skiing" they do not typically think also of "sport". Going from "ski" to "skiing" however, the average person would more likely associate or think "skiing" if given the term "ski". The direction of the arrows in the bond strengths indicates the direction of association. For example, "A→B" in FIG. 3 means that given the concept A, how likely is it or closely would an average person associate the concept B. Going the other direction between the same two concepts may produce a different bond strength.

A "weak relationship" is displayed between "ski" and "K2 ski" (when an average person thinks of "ski," "K2 ski" does not closely come to mind). However, if an average person were to go from "K2 ski" to "ski" this might be construed as a strong relationship since they would naturally associate "ski" if given "K2 ski".

FIG. 3 also shows semantic distances between concepts. "Ski" and "skiing" have only a distance of two between them while "skiing" and "sport" have a distance of five (seven minus two). The distance between "ski" and "sport" is seven. When traveling from parent to child or vice-versa, the distances can be simply added/subtracted but when changing the direction of travel, a penalty may be imposed upon the distance calculation. Take, for example, the distance between "ski" and "athletic equipment company". Judging merely on a linear basis, the distance might be twelve. But since the path from "ski" to "athletic equipment company" switches direction twice (it starts down to "K2 ski" and then across the lateral bond to "K2" and then up to "athletic equipment company") a penalty or scaling factor can cause the distance between "ski" and "athletic equipment" to be much larger than just twelve especially given their lack of connectedness. As described above, penalties may be added when the direction of traversal is switched or when a lateral bond is crossed. Distances between concepts may be calculated and stored for future use. Semantic distances can be determined in a variety of ways, such as, for example, as described in U.S. Pat. No. 6,453,315, which is hereby incorporated by reference.

The concept processor 130 can update and expand the ontology to include new concepts or update relationships and other information for concepts already present. Concepts can be updated or added to reflect the changes in everyday culture or for a particular enterprise. For example, if a new ski manufacturer comes into existence called "Big Ski" this concept can be added to the ontology by a user. The user can define the relationships of other concepts to "Big Ski" and the strength of these relationships as well as other data that defines the concept.

Figure 4:
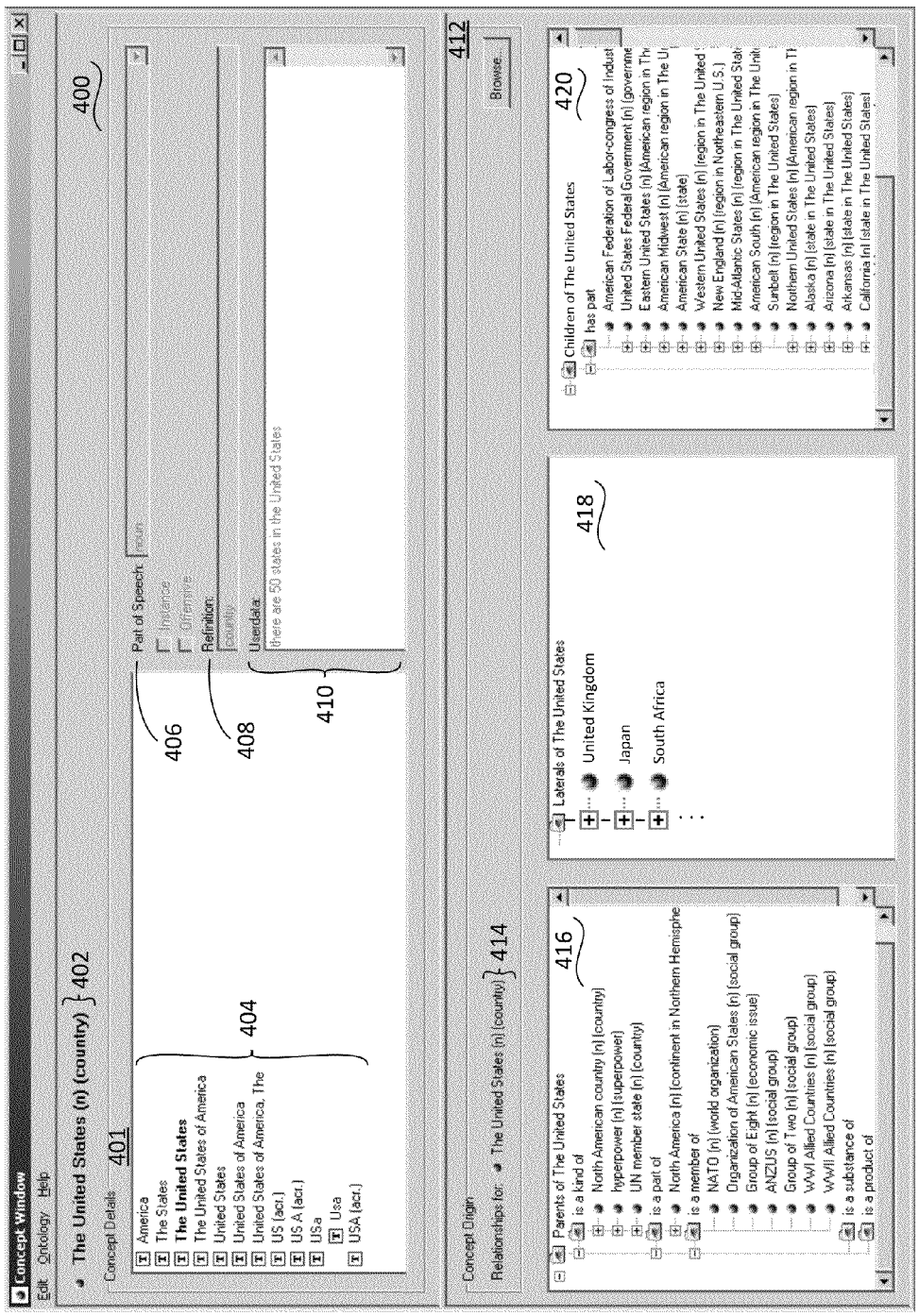
FIG. 4 illustrates an exemplary concept view in accordance with one embodiment of the present invention.

Concepts can be presented to a user 112a on a client device 102a in a concept view, such as a concept window. FIG. 4 illustrates an example of a concept window 400. The concept window 400 shows an example of a concept definition for "The United States". The primary term is shown at 402 and is "The United States". The primary term 402 also indicates the part of speech and provides a context for the concept (or refinition).

The concept window 400 shown further provides a concept details section 401 and a concept relationships section 412. The concept details section 401 can display various details of the concept. For example, at 404 the group of related terms associated with the concept is shown. The part of speech is shown at 406 and indicates that the concept shown is a noun. Refinition is showed at 408 and user data is shown at 410. The refinition box can be used to provide a context for the concept and the user data box can be used to further describe the concept.

The relationships for the concept are shown in the relationship section 412. The concept origin is shown at 414. The various relationships for the concept are shown in boxes 416, 418, and 420. In box 416, the parents of the concept are displayed and in box 420, children of the concept are displayed. Parent concepts and children concepts are concepts with a hierarchical relationship with the origin concept. In box 418, concepts having a lateral relationship with the origin concept are displayed Various methods in accordance with the present invention may be carried out. For example, in one embodiment a user request to create a first concept in a network of interrelated concepts is received, a concept view, such as a concept creation window, is displayed, a primary term representing the first concept is received, at least one related term associated with the primary term is received, at least one relationship between the first concept and a second concept is received, a strength value associated with the relationship is received, and the first concept is added to the network. In one embodiment, the relationship can be hierarchical or lateral and can be selected from one of the following: kind of, has kind, part of, has part, member of, has member, substance of, has substance, product of, and has product.

In another embodiment, a request to edit a first concept in a network of interrelated concepts is received, the first concept is displayed, at least one relationship between the first concept and a second concept is received, a strength value associated with the relationship is received, an edited strength value for an existing relationship between the first concept and another concept is received, and the first concept is updated in the network.

In one embodiment, information defining a part of speech of the first concept, information defining a frequency of the primary term, information defining a likelihood that the primary term and the related terms imply the first concept, information defining a breadth of the first concept, information that the first concept is offensive, user data, and context information, such as refinition, can also be received in order to create or edit the first concept.

Figure 5:
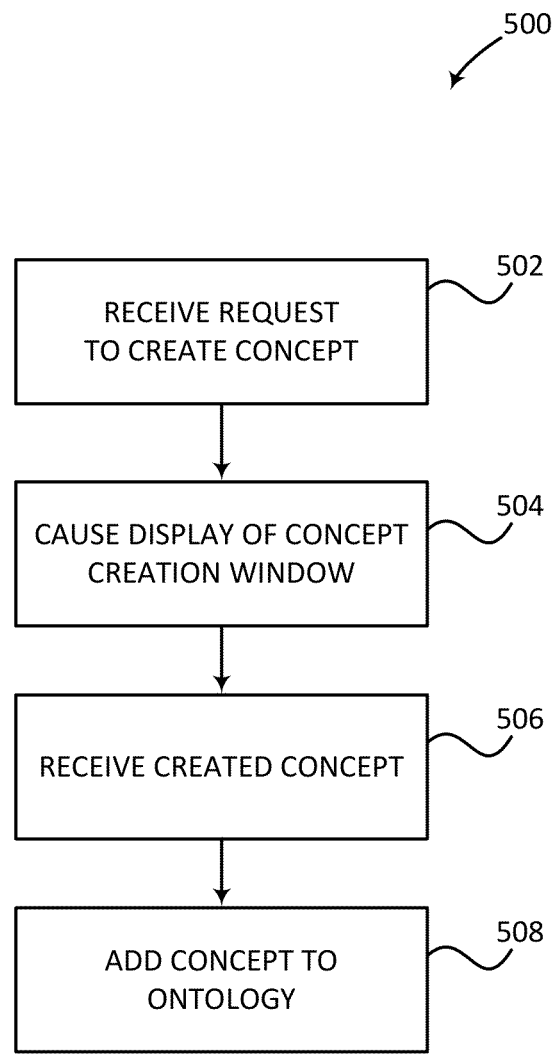
FIG. 5 illustrates a flow diagram of a method in accordance with one embodiment of the present invention.

FIG. 5 illustrates an exemplary method 500 that provides a method for creating concepts in a network of interconnected concepts or ontology. This exemplary method is provided by way of example, as there are a variety of ways to carry out methods according to the present invention. The method 500 shown in FIG. 5 can be executed or otherwise performed by any of various systems. The method 500 is described below as carried out by the system 100 shown in FIG. 1 by way of example, and various elements of the system 100 are referenced in explaining the example method of FIG. 5.

In 502, a request signal from a user to create a concept term is received by the semantic engine 120. The request signal can be created by a user interface application on client device 102a through input from the user 112a and passed to the server device 104 via the network 106.

In response to the signal, the concept processor 130 can cause, in 504, a concept view, such as a concept creation window, to be displayed on the client device 102a. The user 112a can be prompted for the entry of a variety of information in order to define the concept by the concept creation window. The information that defines the concept can include: a primary term used to identify the concept; a group of terms related to the primary term, such as synonyms and acronyms; related concepts and the relationship of the created concept to the related concepts; and the strength of these relationships. The information that defines the concept can also include: the part of speech of the concept; the frequency of the primary term; the likelihood that the primary term and the related terms imply the concept; the breadth or focus of the concept; the offensive nature of the concept; and the literal nature of the primary term. A concept definition can also include user data and a refinition.

In defining a new concept, a user can input a primary term associated with the concept in the concept creation window. The primary term can be the term most frequently associated with the concept. Next, a user can input a group of terms related to the primary term that are also associated with the concept in the concept creation window. For example, the related terms can be synonyms or acronyms of the primary term.

A user 112a can also input concepts related to the created concept and provide relationship types for each related concept. The relationships can include: "kind of"; "has kind"; "part of"; "has part"; "member of"; "has member"; "substance of"; "has substance"; "product of"; and "has product". Relationship types can also be specialized or customized, such as "causes symptom" and "symptom caused by" for a pharmaceutical or medical concept. The relationship type can also be "single concept" for concepts unrelated to others. In one embodiment, the user 112a can define the related concept by typing it in a related concept box and then defining the relationship type by choosing a relationship type from a drop down list.

For every relationship type, the user 112a can assign a strength to the relationship. The strength can be representative of how strong the relationship is. In one embodiment, the strength represents the distance in semantic space the created concept is from the related concept.

The user 112a can also input other information to define the concept. For example, the part of speech of the concept can be provided. A frequency of the primary term can be provided to represent the frequency of the primary term in normal usage or in the source documents. A probability can be provided of the likelihood that the primary term and the related terms imply the concept. The user can specify the breadth or focus of the concept and indicate whether the concept is offensive. The user 112a can also specify whether to match terms associated with the concept literally or can define non-literal acronym and abbreviation rules. The user can also provide user data and context for the concept (or refinition).

After the user 112a has defined the concept, the user 112a can request through the client device 102a that the concept be added to the ontology. This request can cause the data input by the user 112a in the concept creation window to be sent from the client device 102a via the network 106 to the semantic engine 120. In 508, the concept processor 130 can create a new concept in the ontology from the data received 506 from the client device 102a and can add the concept to the ontology in the concept database 122.

Figure 6:
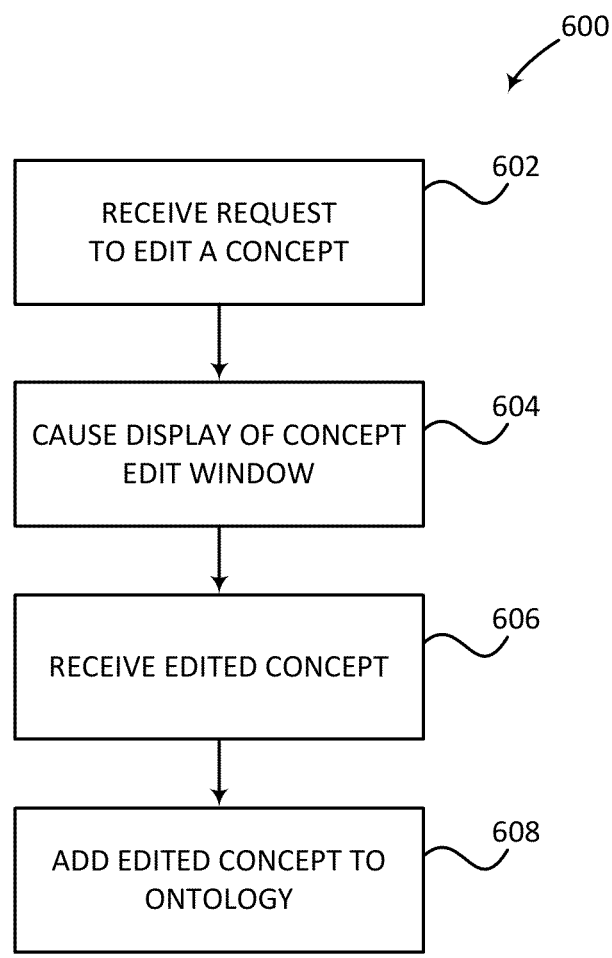
FIG. 6 illustrates a flow diagram of a method in accordance with one embodiment of the present invention.

FIG. 6 illustrates an exemplary method 600 that provides a method for editing concepts in an ontology. This exemplary method is provided by way of example, as there are a variety of ways to carry out methods according to the present invention. The method 600 shown in FIG. 6 can be executed or otherwise performed by any of various systems. The method 600 is described below as carried out by the system 100 shown in FIG. 1 by way of example, and various elements of the system 100 are referenced in explaining the example method of FIG. 6.

In 602, a request signal to edit a concept from a user 112a is received by the semantic engine 120. The request signal can be created by a user interface application on client device 102a through input from the user 112a. This request signal can include the concept to be edited and is passed to server device 104 via the network 106.

In response to the signal, the concept processor 130 can verify that the concept requested exists and can cause in 604 a concept editor window to be displayed on client device 102a. The concept editor window displays the concept definition that the user has requested to edit. A user can edit the various information used to define a concept as described above.

A user can edit the group of terms related to the primary term that are associated with the concept. For example, the user can add additional terms or delete related terms, such as synonyms or acronyms, of the primary term.

A user can also input additional concepts related to the edited concept, input relationship types for each related concept, and edit existing concepts and relationship types. In one embodiment, a user can define and/or edit the relationship type by choosing a relationship type from a drop down list. For the relationship types in the concept definition, the user can assign and edit a strength of the relationship. The user 112a can also input and edit other information in order to edit the concept as described above.

After the user 112a has edited the concept, the user 112a can request through the client device 102a that the edited concept be added to the ontology. This request can cause the data input by the user in the concept edit window to be sent from the client device 102a via the network 106 to the semantic engine 120. In 606, the edited concept is received by the semantic engine 120. In 608, the concept processor 130 can replace the concept in the ontology with the edited concept received from the user 112a or can add the edited data received from the user 112a to the concept in the ontology.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A system comprising:
   one or more computers; and
   a computer-readable medium tangibly embodying a computer program product comprising instructions to cause the one or more computers to perform operations comprising:
   storing, in an entity database, entity data that defines a plurality of entities, the entity data indicating, for each of the plurality of entities, an identifier associated with the entity, a set of terms that are related to the entity, and one or more attributes associated with the entity, wherein storing the data that defines the plurality of entities comprises storing, for each of at least some of the plurality of entities, (i) data indicating a plurality of different synonyms representing different identifiers for the entity and (ii) data that designates a particular one of the different synonyms as a primary identifier for the entity;
   storing, in the entity database, data structures that each associate a respective pair of entities and that each indicate a relationship type for a relationship that exists between the respective pair of entities, wherein each of the relationship types is one of a plurality of predetermined relationship types, the plurality of predetermined relationship types comprising multiple different types of hierarchical relationships, and wherein the entity database comprises data structures that respectively indicate relationships corresponding to the multiple different types of hierarchical relationships;
   receiving data indicative of an input to associate, in the entity database, a first entity with a second entity with a relationship having a specified relationship type that is selected from the plurality of predetermined relationship types; and
   in response to receiving the data indicative of the input, storing, in the entity database, a particular data structure that associates the first entity with the second entity, the particular data structure comprising:
   (i) data identifying the first entity,
   (ii) data identifying the second entity, and
   (iii) data indicating that the first entity and the second entity have a relationship of the specified relationship type that is selected from the plurality of predetermined relationship types.

2. The system of claim 1, wherein, for one or more of the entities, the data that defines the entity further comprises frequency data that reflects a frequency of occurrence of the identifier for the entity in a set of documents.

3. The system of claim 1, wherein the plurality of predetermined relationship types comprises four or more different relationship types; and
   wherein the data indicating that the first entity and the second entity have the relationship of the specified relationship type comprises data that specifies that a hierarchical relationship exists between the first entity and the second entity.

4. The system of claim 1, wherein the data indicating that the first entity and the second entity have the relationship of the specified relationship type comprises data that specifies that a non-hierarchical relationship exists between the first entity and the second entity.

5. A system comprising:
   one or more computers; and
   a computer-readable medium tangibly embodying a computer program product comprising instructions to cause the one or more computers to perform operations comprising:
   storing, in an entity database, entity data that defines a plurality of entities, the entity data indicating, for each of the plurality of entities, an identifier associated with the entity, a set of terms that are related to the entity, and one or more attributes associated with the entity;
   storing, in the entity database, data structures that each associate a respective pair of entities and that each indicate a relationship type for a relationship that exists between the respective pair of entities, wherein each of the relationship types is one of a plurality of predetermined relationship types, the plurality of predetermined relationship types comprising multiple different types of hierarchical relationships, and wherein the entity database comprises data structures that respectively indicate relationships corresponding to the multiple different types of hierarchical relationships, wherein the plurality of predetermined relationship types include:
   (i) a first relationship type indicating that an entity is a kind of another entity,
   (ii) a second relationship type indicating that an entity is a part of another entity, and (iii) a third relationship type indicating that an entity is a member of a group represented by another entity;

receiving data indicative of an input to associate, in the entity database, a first entity with a second entity with a relationship having a specified relationship type that is selected from the plurality of predetermined relationship types; and in response to receiving the data indicative of the input, storing, in the entity database, a particular data structure that associates the first entity with the second entity, the particular data structure comprising:
(i) data identifying the first entity,
(ii) data identifying the second entity, and
(iii) data indicating that the first entity and the second entity have a relationship of the specified relationship type that is selected from the plurality of predetermined relationship types.

6. The system of claim 5, wherein, for one or more of the entities, the data that defines the entity further comprises frequency data that reflects a frequency of occurrence of the identifier for the entity in a set of documents.

7. The system of claim 5, wherein the data indicating that the first entity and the second entity have the relationship of the specified relationship type comprises data that specifies that a hierarchical relationship exists between the first entity and the second entity.

8. The system of claim 5, wherein the data indicating that the first entity and the second entity have the relationship of the specified relationship type comprises data that specifies that a non-hierarchical relationship exists between first entity and the second entity.

9. A computer-implemented method comprising:

storing, in an entity database, entity data that defines a plurality of entities, the entity data indicating, for each of the plurality of entities, an identifier associated with the entity, a set of terms that are related to the entity, and one or more attributes associated with the entity, wherein storing the data that defines the plurality of entities comprises storing, for each of at least some of the plurality of entities, (i) data indicating a plurality of different synonyms representing different identifiers for the entity and (ii) data that designates a particular one of the different synonyms as a primary identifier for the entity;

storing, in the entity database, data structures that each associate a respective pair of entities and that each indicate a relationship type for a relationship that exists between the respective pair of entities, wherein each of the relationship types is one of a plurality of predetermined relationship types, the plurality of predetermined relationship types comprising multiple different types of hierarchical relationships, and wherein the entity database comprises data structures that respectively indicate relationships corresponding to the multiple different types of hierarchical relationships;

receiving data indicative of an input to associate, in the entity database, a first entity with a second entity with a relationship having a specified relationship type that is selected from the plurality of predetermined relationship types; and in response to receiving the data indicative of the input, storing, in the entity database, a particular data structure that associates the first entity with the second entity, the particular data structure comprising:
(i) data identifying the first entity,
(ii) data identifying the second entity, and
(iii) data indicating that the first entity and the second entity have a relationship of the specified relationship type that is selected from the plurality of predetermined relationship types.

10. The method of claim 9, wherein, for one or more of the entities, the data that defines the entity further comprises frequency data that reflects a frequency of occurrence of the identifier for the entity in a set of documents.

11. The method of claim 9, wherein the data indicating that the first entity and the second entity have the relationship of the specified relationship type comprises data that specifies that a hierarchical relationship exists between the first entity and the second entity.

12. The system of claim 1, wherein storing the data that defines the plurality of entities comprises storing, for at least some of the plurality of entities, (i) data indicating a part of speech of the synonym designated as the primary identifier, and (ii) a user-submitted description for the entity.

13. The system of claim 1, wherein the plurality of predetermined relationship types include:
(i) a first relationship type indicating that an entity is a kind of another entity,
(ii) a second relationship type indicating that an entity is a part of another entity, and
(iii) a third relationship type indicating that an entity is a member of a group represented by another entity.

14. The system of claim 13, wherein the data indicating that the first entity and the second entity have a relationship of the specified relationship type is data that indicates the first relationship type and indicates that the first entity is a kind of the second entity;
wherein the operations further comprise storing a data structure comprising data that indicates the second relationship type and indicates that the first entity is a part of a third entity; and
wherein the operations further comprise storing a data structure comprising data that indicates the third relationship type and indicates that the first entity is a member of a group represented by a fourth entity.

15. The system of claim 1, wherein receiving the data indicative of an input to associate a first entity with a second entity comprises receiving data indicative of user input provided through a user interface, the user input specifying the first entity, the second entity, the specified relationship type, and a direction that a relationship of the specified relationship type exists between the first entity and the second entity.

16. The system of claim 15, wherein receiving the data indicative of user input provided through the user interface further comprises receiving data indicative of user-specified terms related to the first entity; and
wherein the operations further comprise storing, in the entity database, entity data that indicates the user-specified terms as the set of terms that are related to the first entity.

17. The system of claim 1, wherein the data indicative of the input further indicates a strength of the relationship between the first entity and the second entity; and
wherein the particular data structure that associates the first entity with the second entity comprises data indicating the strength of the relationship between the first entity and the second entity.

18. The system of claim 17, wherein the data indicating the strength of the relationship comprises a first value that indicates a strength of the relationship between the first entity and the second entity in a first direction;
wherein the entity database further stores a second value that indicates a strength of the relationship between the first entity and the second entity in a second direction, the second value indicating a level of strength for the second direction that is different from the level of strength that the first value indicates for the first direction.

19. The system of claim 18, wherein the first value and the second value each represent levels of strength for a direct connection between the first entity and the second entity in a network of interconnected entities.

20. A computer-implemented method comprising:
- storing, in an entity database, entity data that defines a plurality of entities, the entity data indicating, for each of the plurality of entities, an identifier associated with the entity, a set of terms that are related to the entity, and one or more attributes associated with the entity;
- storing, in the entity database, data structures that each associate a respective pair of entities and that each indicate a relationship type for a relationship that exists between the respective pair of entities, wherein each of the relationship types is one of a plurality of predetermined relationship types, the plurality of predetermined relationship types comprising multiple different types of hierarchical relationships, and wherein the entity database comprises data structures that respectively indicate relationships corresponding to the multiple different types of hierarchical relationships, wherein the plurality of predetermined relationship types include:
  - (i) a first relationship type indicating that an entity is a kind of another entity,
  - (ii) a second relationship type indicating that an entity is a part of another entity, and
  - (iii) a third relationship type indicating that an entity is a member of a group represented by another entity;
- receiving data indicative of an input to associate, in the entity database, a first entity with a second entity with a relationship having a specified relationship type that is selected from the plurality of predetermined relationship types; and
- in response to receiving the data indicative of the input, storing, in the entity database, a particular data structure that associates the first entity with the second entity, the particular data structure comprising:
  - (i) data identifying the first entity,
  - (ii) data identifying the second entity, and
  - (iii) data indicating that the first entity and the second entity have a relationship of the specified relationship type that is selected from the plurality of predetermined relationship types.

* * * * *